United States Patent Office 3,498,942
Patented Mar. 3, 1970

3,498,942
EMULSION POLYMERIZATION OF UNSATURATED MONOMERS UTILIZING ALKYL SULFIDE TERMINATED OLIGOMERS AS EMULSIFIERS AND RESULTING PRODUCT
Leland E. Dannals, Waterbury, Conn., assignor to Uniroyal, Inc., a corporation of New Jersey
No Drawing. Filed July 1, 1966, Ser. No. 562,098
Int. Cl. C08f *1/13;* C08d *1/09*
U.S. Cl. 260—29.6     55 Claims

ABSTRACT OF THE DISCLOSURE

This invention relates to emulsion, addition polymerization of rubber and plastic latexes and solid polymers produced therefrom. More specifically, the instant invention teaches the use of an alkyl sulfide terminated oligomer having appendant cyano and carboxyl groups on the oligomeric portion, as an emulsifier in said emulsion polymerizations.

---

In emulsion polymerization, the emulsifier plays a key role, not only in the polymerization itself, but also in the finishing and properties of the latex. Because of the need to use existing resources as efficiently as possible, the rate of polymerization is a most important factor. It is also essential that the emulsifier form a latex, (1) low in macroscopic discontinuities, such as coagulum, grain, or microfloc which cause manufacturing difficulties and reduce product utility, (2) low in foaming, since this would obviate the need for anti-foaming agents, (3) of small particle size or turbidity of lower value, since this increases productivity and is also beneficial to ultimate use, (4) low in viscosity since this makes for efficient transfer without hold-up losses, (5) of high latex solids concentration, since this increases productivity and decreases transportation costs, and (6) of good mechanical stability, such as giving low values in the S–1 test, since the latex must stand up against deterioration on storage, transport, compounding and use.

In accordance with this invention it has been found that alkyl sulfide terminated oligomers are outstanding emulsifiers for emulsion polymerization. They have the formula:

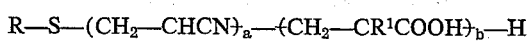

where R is a straight chain primary (normal), branched chain primary, or secondary alkyl having from 6 to 12 carbon atoms, preferably a normal alkyl group having from 7 to 11 carbon atoms, and, most desirably, 8 or 10 carbon atoms; or mixtures thereof. $R^1$ is either hydrogen or methyl; $a+b$, the degree of polymerization, is broadly from 4 to 50, preferably from 12 to 30 and $a/(a+b)$ is 0 to 0.6, most preferably 0.2 to 0.55. It should be understood that the monomer units are randomly distributed in the oligomer and the above structural formula is used for convenience only.

THE EMULSION POLYMERIZATION

The emulsion polymerization of the instant invention may be applied to the preparation of a wide variety of addition polymers. These polymers are formed by the polymerization of vinyl, i.e., copolymerizable monoethylenically unsaturated compounds, and conjugated diolefinic monomers. Among the conjugated diolefin polymers and copolymers are butadiene, butadiene-styrene, butadiene-acrylonitrile, butadiene-vinylidene chloride, and butadiene-methacrylonitrile. The vinyl-type polymers and copolymers are styrene, styrene-acrylonitrile, styrene-methacrylonitrile, ethyl acrylate, ethyl acrylate-vinyl acetate, ethyl acrylate-methyl methacrylate, ethyl acrylate-styrene, ethyl acrylate-butyl acrylate and butyl acrylate-acrylonitrile.

The addition polymers produced by the emulsion polymerization of the instant invention may be of rubber or plastic type, and consequently their emulsions could be termed rubber latex or plastic latex. Rubber may be defined as a material that is capable of recovering from large deformations quickly and forcibly, and can be or already is modified to a state in which it is essentially insoluble (but can swell) in boiling solvent such as benzene, methyl ethyl ketone and ethanol-toluene azeotrope.

Rubber in its modified state, free of diluents, retracts within one minute to less than 1½ times its original length after being stretched at room temperature (20–27° C.) to twice its length and held for one minute before release.

Plastic may be defined as a material that contains as an essential ingredient an organic substance of large molecular weight, is solid in its finished state, but at some stage in its manufacture or in its processing into finished articles can be shaped by flow.

Particularly preferred polymers of the instant invention are the carboxylated conjugated diolefin type. These include butadiene-styrene or butadiene-acrylonitrile with itaconic acid, acrylic acid, methacrylic acid, maleic acid, fumaric acid, cinnamic acid, vinylacrylic acid, ethacrylic acid, 2-ethyl-3-propylacrylic acid, beta-acryloxypropionic acid and sorbic acid.

The relative amounts of the aforesaid monomers vary widely and are well known to those skilled in the art. In the case of the carboxylated butadiene-styrene latexes the amount of polymerized butadiene and styrene varies from 40 to 60% by weight based on the total weight of latex and the amount of the carboxyl component generally ranges from 0.5 to 5% of the total polymerized monomers.

The emulsion solution, i.e., the salt of the oligomer and water, contains from 10 to 60% solids and has a surprisingly low viscosity, e.g., 1–10 cp., at 10 to 20% solids. Generally, 100 parts by weight of monomer for each 4 or 5 parts of solids in the emulsifier solution are introduced at a temperature of about 50° C. at a pressure of 35–45 p.s.i.g. These conditions are typical and may be varied within wide ranges according to known emulsion polymerization technology.

The range of typical emulsion polymerization recipes and reaction conditions are given in Table 1.

TABLE 1.—RANGE OF TYPICAL EMULSION POLYMERIZATION RECIPES AND REACTION CONDITIONS

| | Parts by Weight | |
|---|---|---|
| | Broadly | Preferably |
| Component: | | |
| Monomers | 100 | 100 |
| Water | 70–240 | 90–180 |
| Emulsifier | 2–8 | 3–6 |
| Modifier | 0–0.1 | 0–0.5 |
| Initiator | 0.2–2.0 | 0.3–1.5 |
| Electrolyte | 0–2.0 | 0–0.8 |
| Chelating Agent | 0–0.1 | 0–0.07 |
| Reaction Conditions: | | |
| Temperature, ° C | −25–100 | 30–70 |
| Time, hrs | 10–200 | 15–36 |

The various modifiers, initiators, electrolytes and additives employed are conventional and are known to those skilled in the art. See Whitby, Synthetic Rubber, John Wiley & Sons, Inc. New York, 1954, pp. 224–283. As modifiers, aliphatic mercaptans are most commonly employed; and initiators include redox systems, which generate free radicals, with or without complexing agents, and, variable valence metal ions. Common initiators are persulfates, peroxides, hydroperoxides, ferricyanides, and peroxamines, and diazo compounds such as diazo bis(isobutyronitrile).

After about 95 to 100% conversion of monomer to polymer is achieved, the pH of the emulsion is increased to 8.5–9.5 with a base such as ammonium hydroxide. Any unreacted monomer may be driven off by bubbling steam through the solution. This stripping operation is slow and difficult when latexes prepared on conventional emulsifiers are involved because of foaming which impedes the distillation of monomers and water and requires foam traps and a distillation pot, only partly full, to avoid loss of latex by foam carry-over. However, latexes prepared with the oligomeric emulsifiers of the instant invention can be stripped rapidly from a nearly full pot without the use of a foam trap, since they do not foam. This behavior of oligomeric emulsified latexes is unique and useful. While anti-foaming agents can be used with conventional emulsifier latexes, these agents add to cost and may damage polymer properties by appearing in the polymer as a separate phase. Since stripping dilutes the latex, it is finally concentrated to about 50% solids. This operation, too, is greatly facilitated by the absence of foam in oligomeric emulsifier latexes and can be rapidly done by distilling off water from the latex in a distillation pot. Conventional emulsifier latexes can only be concentrated in apparatus which exposes a thin film of the latex, such as a multiple disc concentrator, because of their tendency to foam.

THE PREPARATION OF THE ALKYL SULFIDE TERMINATED OLIGOMER

Thees oligomers used in emulsion polymerization may be readily prepared by reacting an alkyl mercaptan with acrylonitrile and acrylic acid or methacrylic acid in an alcoholic reaction medium in the presence of a free-radical catalyst. The oligomer product is preferably used as a water solution of its ammonium or alkali metal salt, e.g., potassium or sodium, or amine salt, e.g., lower alkyl or alkanol substituted ammonium salt, such as diethanolamine. The oligomer also may be partially neutralized with alkali metal hydroxides, ammonium hydroxide, or lower alkyl or alkanol amines and used in that state, or neutrlization may then be completed with calcium hydroxide or other alkaline earth or Group IV heavy metal oxides or hydroxides.

The oligomer is formed in an essentially waterfree reaction medium, preferably, in a lower alcohol having a boiling point of less tha 100° C., e.g., methanol, ethanol and propanol. Other solvents which dissolve the reactants, the catalyst, and the oligomer, may also be advantageously used.

Generally, the oligomerization temperature is maintained at 20–60° C. Optimum temperature may readily be determined for each oligomerization and depends on reaction rate and relative reactivity of the monomers and mercaptan. In order to facilitate the free-radical propagation necessary for an effective catalytic reaction, an oxygen-free atmosphere is desirable. This may be obtained by passing an inert gas such as nitrogen through the reaction system.

The catalyst employed may be a free-radical initiator, such as the peroxides and persulfates. As required, activators may be added as, for example, N,N-dimethylaniline. Particularly outstanding results are obtained with organic peroxides and hydroperoxides, hydrogen peroxide, diazo compounds such as diazo bis(isobutyronitrile) and water soluble persulfates. Specific examples include ammonium persulfate, the alkali metal and alkaline earth metal persulfates and the alkyl peroxides such as lauroyl peroxide, cyclohexyl peroxide and t-butyl peroxide. Similarly catalytic amounts of initiator are used, i.e., between 0.1 and 6.0 g. per total mole of vinyl monomers (excluding mercaptans) depending on the particular initiator and the momomer system. For example, from 0.1 to 0.5 gram of the ammonium persulfate catalyst are employed per mole of monomers (calculated as the total moles of the vinyl monomers). If the catalyst is lauroyl peroxide the range is 0.5 to 6.0 g. While lesser amounts can be used, it will decrease the conversion. Greater amounts give no significant advantage.

A convenient method of carrying out the reaction is to initially dissolve the alkyl mercaptan and the monomer or monomers, as the case may be, in the alcoholic solvent. The catalyst and activator, if used, may be also charged initially or added during the reaction. Upon completion of the reaction, the reaction product is homogeneous, and it may be treated with an aqueous base, as for example an alkali metal hydroxide, such as potassium hydroxide, to neutralize some or all of the acid present to a pH of from about 4.8 to 9.0. By vacuum stripping, the solvent may be separated leaving a water solution of the salt, e.g., the potassium salt, of the oligomers of the instant invention.

Examples I and II show the preparation of the emulsifiers used in the invention:

EXAMPLE I

The oligomeric material having the general formula n-alkyl-S-[acryonitrile]$_a$-[acrylic acid]$_b$-H are prepared in methanol using ammonium persulfate as the initiator. The general procedure employed is to add the acrylic acid, acrylonitrile, n-alkyl mercaptan and methanol solvent to a reaction flask which is immersed in a thermostatted water bath, set at the reaction emperaure, and equipped wtih an addition funnel, a thermometer, an agitator, a water-cooled condenser and a nitrogen inlet. The solution is agitated and the nitrogen flow is started. When the reaction temperature, in this example 35° C., is reached, a solution of the inititator in methanol is introduced at a controlled rate into the flask via the addition funnel. Because the reaction gives off heat, it is necessary, at first, to lower the water bath temperature in order to maintain a constant oligomerization temperature.

Run 1—Preparation of n-octyl-S-[acryionitrile]$_8$-[acrylic acid]$_8$-H

The following materials are added to the reaction flask:

388.8 g. (5.4 moles) acrylic acid
286.2 g. (5.4 moles) acrylonitrile
98.6 g. (0.675 moles) n-octyl mercaptan
110.7 g. methanol Following the procedure outlined above the reaction is initiated at the reaction temperature by introducing a solution of the initiator at a rate of 39 ml./hr. A total of 0.232 g. ammonium persulfate per mole of monomers (calculated as moles of acrylonitrile and acrylic acid only) are added. This equals a total of 2.5 g. of ammonium persulfate.

The transparent greenish-yellow reaction mix is determined to be 65.0% solids, as compared to a theoretical solids content of 65.3%, showing an essentially 100% conversion. The viscosity of the mix is about 1000 cp. After evaporation to dryness at 100° C./2 mm. for 30 minutes, a white, friable powder, soluble in methanol, acetone, methyl ethyl ketone and cyclohexanone, remains. By vapor phase osmometry the number average molecular weight is found to be about 1100 as compared to a calculated value of 1146. Analysis shows the reaction product contains 50% acrylic acid, 36.5% acrylonitrile and 13.5% n-octyl mercaptan and is essentially pure. This material upon conversion to the potassium salt is a useful surface active agent.

Run 2—n-octyl-S-[acrylonitrile]$_3$-[acrylic acid]$_3$-H

Following the procedure described in Run 1, 115 g. (1.6 moles) acrylic acid, 84.8 g. (1.6 moles) acrylonitrile, 7.87 g. (0.533 moles) n-octyl mercaptan and 16 g. methanol are added to the reaction flask. 147 ml. of an ammonium persulfate solution (0.66 g. [NH$_4$]$_2$S$_2$O$_8$/100 ml. methanol) are added during the 5½ hours of the reaction. This is equivalent to 0.303 g./mole of monomer. The solids obtained are 63.3% indicating a conversion of 93.5%.

Additional runs for preparing R-S-(acrylonitrile)$_a$-(acrylic acid)$_b$-H, all using the general procedure described above, are shown in the following Table 2:

isopropanol. This is heated by a 40° C. water bath. When the temperature of flask reaches 40° C., 7 drops of N,N-dimethylaniline (DMA) are added. After 25 minutes, the reaction starts and the temperature reaches 48.5° C. at 45 min. then falls to 40.9° C. at 3 hours. 15 drops of DMA are then added, but no exotherm results. The reaction product is diluted with water and stripped free of isopropanol without neutralization. It is soluble in water in its acidic form.

TABLE 2.—PREPARATION OF R-S-(ACRYLONITRILE)$_a$-(ACRYLIC ACID)$_b$-H OLIGOMERS

| | | | Materials loaded, grams | | | | 0.66 gram (NH$_4$)$_2$S$_2$O$_8$ per 100 ml. methanol | | Reaction | | |
|---|---|---|---|---|---|---|---|---|---|---|---|
| R | $a+b$ | $a/a+b$ | Acrylic acid | Acrylonitrile | RSH | Methanol | Ml. used | Gram/mole monomers | Temp., °C. | Time hours | Percent conversion |
| Run No.: | | | | | | | | | | | |
| 3 ___ n-Octyl ___ | 10 | 0.5 | 144 | 106 | 58.4 | 20 | 147 | 0.243 | 35 | 5¾ | 97.0 |
| 4 ___ do ___ | 14 | 0.4 | 172.8 | 84.8 | 41.8 | 14 | ¹ 157 | 0.086 | 35 | 7⅙ | 97.4 |
| 5 ___ do ___ | 14 | 0.5 | 144 | 106 | 41.8 | 35 | 124.5 | 0.205 | 35 | 5⅔ | 98.1 |
| 6 ___ do ___ | 20 | 0.5 | 129.6 | 95.4 | 26.3 | 36 | ² 71 | 0.126 | 35 | 8⅔ | 98.5 |
| 7 ___ n-Dodecyl ___ | 14 | 0.5 | 144 | 106 | 57.8 | 20 | 105 | 0.174 | 30 | 8 | 99.7 |
| 8 ___ do ___ | 20 | 0.4 | 129.6 | 63.6 | 30.3 | 25 | 44 | 0.097 | 35 | 5⅙ | 98.2 |
| 9 ___ do ___ | 20 | 0.5 | 129.6 | 95.4 | 36.4 | 36 | 78 | 0.138 | 35 | 5¾ | 98.9 |
| 10 ___ n-Decyl ___ | 16 | 0.5 | 144 | 106 | 43.5 | 41 | 146 | 0.240 | 35 | 6 | 99.4 |
| 11 ___ do ___ | 30 | 0.5 | 216 | 159 | 34.8 | 61.5 | 200 | 0.220 | 35 | 7½ | 98.7 |
| 12 ___ do ___ | 16 | 0.25 | 216 | 53 | 43.5 | 133 | 132 | 0.218 | 35 | 5½ | 97.9 |

¹ The initiator solution used in this run was 0.22 g. (NH$_4$)$_2$S$_2$O$_8$/100 ml. methanol.
² The initiator solution used in this run was 0.64 g. (NH$_4$)$_2$S$_2$O$_8$/100 ml. methanol.

EXAMPLE II

Using the same reaction flask as described in Example I, additional low molecular weight compounds are prepared. In these runs the solvent is isopropanol and the initiator lauroyl peroxide.

Run 1—n-octyl-S-[acrylonitrile]$_8$-[acrylic acid]$_{12}$-H

The following materials are added to the reaction flask:

907.2 gm. (12.6 moles) acrylic acid
445.2 gm. (8.4 moles) acrylonitrile
153.2 gm. (1.05 moles) n-octyl mercaptan
10.5 gm. (0.5 gm./mole of monomers) lauroyl peroxide
420 gm. isopropanol The flask is heated to 50° C. by means of the water bath.

After 3½ hours it is noted that the reaction mix becomes very viscous. At this time an additional 591 grams of isopropanol are added. After 4.8 hours 204.1 grams (2.835 mols) of acrylic acid and 136.1 grams isopropanol are added. Additional initiator, namely, 5.25 grams (0.25 grams per mole of monomer) of lauroyl peroxide are added after 5½ hours. At the end of 9 hours the bath is cooled from the reaction temperature to 30° C. It remains at this temperature until the end of the run. After 24 hours the conversion is 94.8%.

The reaction product is a transparent yellowish liquid which contains 56.9% solids and has a viscosity of 16,500 centipoises. After drying the reaction product for 30 minutes at 100° C. at 2 mm. pressure, a solid is obtained which was 62.1% acrylic acid, 9.7% n-octylmercaptan and 25.3% acrylonitrile (a total of 97.1%). The intrinsic viscosity in isopropanol of this powder is 0.056. This reaction product can be used as an emulsifier by stripping off the solvent from the aqueous neutralized reaction mixture as described for run 1 in Example I. KOH is used for the neutralization.

Run 2—n-octyl-S-[acrylic acid]$_{10}$-H

In a laboratory reactor are placed 72 g. acrylic acid (1 mole), 14.6 g. (0.1 mole) n-octyl mercaptan, 1.5 g. lauroyl peroxide (1.5 g./mole of monomer), and 350 ml.

Run 3—n-octyl-S-[acrylic acid]$_{20}$-H

In a laboratory reactor are placed 46.3 g. acrylic acid (0.643 mole), 4.7 g. n-octyl mercaptan (0.032 mole), 1.1 g. lauroyl peroxide (1.7 g./mole of monomers), and 353.7 g. isopropanol. This is heated by means of a water bath to 39.9° C. and 11 drops of DMA are then added. The temperature of the reaction rises to 40.8° C. in thirty minutes, is held at this temperature for 45 minutes and falls to 40.2° C. during the ensuing 75 minutes. At that time, the addition of 1 g. lauroyl peroxide and 10 drops DMA produces a temperature rise to 40.4° C. The raaction is continued for 3 hours.

The reaction product is diluted with water and stripped without neutralization to remove the isopropanol. It is soluble throughout this process. A 1% solution has the following surface tensions at the indicated pH: 33 d./cm. at pH 3.2; 39 d./cm. at pH 9.5

Run 4—n-octyl-S-[acrylonitrile]$_{10}$-[acrylic acid]$_{10}$-H

In a bottle reactor are placed 36 g. acrylic acid (0.5 mole), 26.5 g. acrylonitrile (0.5 mole), 7.3 g. n-octyl mercaptan (0.05 mole), 6 g. lauroyl peroxide (6 g./mole of monomer) and 274 g. isopropanol. The bottle is rotated for 39 hrs. in a 50° C. bath and solids analysis indicates 88% conversion. The reaction product is neutralized with KOH and stripped. A 10% solution has a surface tension of 27.0 d./cm.

Run 5—n-octyl-S-[acrylonitrile]$_{16}$-[acrylic acid]$_{24}$-H

In a laboratory reactor are placed 21.2 g. acrylonitrile (0.4 mole), 43.2 g. acrylic acid (0.6 mole), 3.65 g. n-octyl mercaptan (0.025 mole) and 195 g. isopropanol. The reaction mix is heated to 70° C. and 1 g. lauroyl peroxide is added. The temperature rises to 73.4° C. Lauroyl peroxide is added: 1 g. at the end of 43 min. and 1 g. at the end of 103 min. from initial addition of lauroyl peroxide. Reaction is stopped at 6 hours. The conversion is 83.5%.

Run 6—n-dodecyl-S-[acrylic acid]$_{10}$-H

In a laboratory reactor are placed 72 g. acrylic acid (1 mole), 20.2 g. n-dodecyl mercaptan (0.1 mole), 1.5 g. lauroyl peroxide, and 275 g. isopropanol. The reaction is heated to 39.3° C. and 7 drops DMA (N,N-dimethylaniline) are added. The temperature rises to 46.7° C. in 1 hour. At 75 min., when temperature drops to 43.9° C., 8 drops DMA are added, which causes the temperature to rise to 45.4° C. Subsequent additions of 0.5 g. lauroyl peroxide and 5 drops DMA cause no exotherm. The reaction is stopped after 7.5 hours and the conversion is 98%. The reaction product is diluted with water and stripped free of alcohol.

Run 7—n-dodecyl-S-[acrylic acid]$_{20}$-H

This oligomer is prepared as in Run 6, except for use of 10.1 g. n-dodecyl mercaptan (0.05 mole). The reaction product is diluted with water and stripped free of isopropanol without neutralization.

Run 8—n-dodecyl-S-[acrylonitrile]$_{10}$-[acrylic acid]$_{10}$-H

This oligomer is prepared as in Run 4 except for the use of 10.1 g. n-dodecyl mercaptan in place of the n-octyl mercaptan. 82% conversion is attained. The reaction mix is neutralized with aqueous KOH and stripped.

The following examples illustrate the emulsion polymerizations and the latexes formed which are within the scope of the instant invention:

EXAMPLE III

Part A.—To conduct the emulsion polymerization, twenty-four fluid ounce soda bottles containing the polymerization ingredients are fitted with a crown cap having a small hole in the center. The metal cap is fitted with a self-sealing rubber gasket so that upon addition of the materials or removal of samples by the use of a hypodermic ensemble, the cap will be self-sealing. A plurality of these bottles are rotated, as spokes on a wheel, in a thermostatic bath at 50° C. at eleven revolutions per minute. Prior to capping, the bottles are purged of oxygen by the introduction of slight excess of butadiene which is allowed to evaporate. The polymerization ingredients, listed in Table 3, are placed in the bottle, in amounts, as grams, equal to twice the indicated figures.

TABLE 3

Emulsion polymerization recipe for a carboxylated butadiene-styrene latex

| Component: | Parts by weight |
| --- | --- |
| Butadiene | 40 |
| Styrene | 59 |
| Itaconic acid | 1 |
| Oligomer | 4 |
| Potassium persulfate | 1.25 |
| Potassium carbonate | 0.4 |
| Tetrasodium ethylene-diamine tetraacetate | 0.07 |
| Tertiary dodecyl mercaptan | 0.1 |
| Water | 120 |

The emulsifier used in this example has the formula

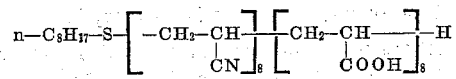

and is a preferred species. It is fully neutralized with KOH and dissolved in water. After 22 hours at 50° C., the bottle is removed from the bath and solids determination shows that approximately 100% of the monomers are converted to the carboxylated latex polymer. The pH of the latex is raised to 9.5 with potassium hydroxide and then placed in a stripper which is heated with agitation, but without vacuum, to 90° C. Steam, at 100° C., is bubbled through the latex and water and residual monomer distilled off until about 100 grams are collected. Steam introduction is then discontinued and a vacuum applied to further concentrate the latex. During these finishing operations, no foaming occurs and no coagulum is formed. The latex has the following composition and properties: no grain, microfloc or coagulum; solids 50.3%; pH 8.2; residual styrene 0.03%; S-1 stability 0.01; surface tension 70 d./cm.; Brookfield viscosity 308 cp.; turbidity 0.65.

The above properties clearly show that a highly desirable latex is formed. Unexpectedly an outstanding mechanical stability (S-1 test) is obtained at a high surface tension. As mentioned previously, this high surface tension facilitates finishing operations, eliminates the need for anti-foaming agents, since the latex does not foam and the outstanding mechanical stability indicates a product that will not readily deteriorate. The latex viscosity shows economical transfer is possible and the turbidity is not too high for good results in use.

The above latex is considerably superior to those obtained using conventional emulsifiers, such as alkyl benzene sulfonates which, at 50% solids, have a surface tension of 40 d./cm. at the same S-1 stability, and readily form a foam on agitation which interferes with finishing and use.

Since the above latex has a high surface tension, the oligomeric emulsifier must be virtually absent from the continuous water phase and its air interface. The emulsifier then can only be located at the surface of the latex particle, since if the oligomers were within the particle, poor mechanical stability of the latex would result. The forces which hold the oligomer to the surface are physical rather than chemical, since on destabilization of the emulsion in the presence of a nonionic emulsifier, most of the oligomer appears in the serum rather than with the polymer. It is concluded that the oligomer exists, unchanged (except, perhaps, for the partial oxidation of the oligomer as heretofore discussed), in the latex and at the particle surface where it stabilizes the emulsion.

Part B.—The polymer in the latex formed in Part A is isolated by spreading a thin layer of the latex on glass and allowing the water to evaporate. The resulting film is dried further in an oven. Stress-strain measurements on this film, compared to a similar one prepared from an alkyl benzene sulfonate emulsified latex, show that for 300% elongation the former requires 630 p.s.i. while only 310 p.s.i. is required for the latter. At least a part of this greater strength is thought to be due to the affinity of the oligomer for the polymer. Thus, unlike the conventional alkyl benzene sulfonate, the oligomer does not form a separate phase as the latex dries and so does not exist as strength-reducing discontinuities in the film.

Part C.—The polymer in the latex from Part A may also be isolated by flocculation in which enough latex is taken to give 100 g. of solids. To this is added 1.5 g. of antioxidant [β,β'-bis(2-hydroxy,3-nonyl, 5-methylbenzylthio)diethyl ether in emulsified form], 700 g. water and, with vigorous agitation, 1000 g. of 4% alum $(NH_4Al(SO_4)_2.12H_2O)$. The emulsion is destabilized, and separates into a clear serum and small pieces of polymer which are removed by filtration and reslurried three times with 1000 g. water. Titration of the serum shows no oligomer present, and it is, therefore, presumed to be associated with the polymer, which is dried in a 60° C. oven overnight to yield a white polymer which has a Mooney viscosity of over 200 and 86% gel in benzene. A latex similar to the above except that it is prepared on alkyl benzene sulfonate yields a slightly yellow polymer which has a Mooney viscosity over 200, and 87% gel in benzene, when flocculated in the same way.

EXAMPLE IV

Following the procedure and using the emulsion polymerization recipe set forth in Example III, Table 4 shows the use of n-octyl sulfide oligomers at various oligomeric chain lengths as emulsifiers. In each case equal molar quantities of acrylonitrile and acrylic acid are present in the oligomer and the reaction temperature is 50° C.

TABLE 4.—PREPARATION OF CARBOXYLATED BUTADIENE-STYRENE LATEX ON OLIGOMERS OF VARIOUS CHAIN LENGTHS

| | Number | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 21 | 13 |
| Description of the oligomer: | | | | | | | | | | | | | |
| a+b | 6 | 8 | 10 | 12 | 14 | 15 | 16 | 18 | 20 | 30 | 50 | 70 | 100 |
| a/(a+b) | 0.5 | 0.5 | 0.5 | 0.5 | 0.5 | 0.5 | 0.5 | 0.5 | 0.5 | 0.5 | 0.5 | 0.5 | 0.5 |
| Parts used | 4 | 4 | 4 | 4 | 4 | 4 | 4 | 4 | 4 | 4 | 4 | 4 | 4 |
| pH, 10% solution of potassium salt | 6.4 | 6.5 | 7.5 | 6.5 | 6.5 | 6.5 | 9.0 | 8.5 | 6.5 | 9.0 | 9.0 | 9.0 | 8.5 |
| Polymerization performance: | | | | | | | | | | | | | |
| Percent conversion | 96 | 99 | 100 | 100 | 100 | 99 | 100 | 99 | 99 | 100 | 100 | 100 | 94 (22) |
| Hours | 18 | 64 | 64 | 64 | 64 | 64 | 64 | 64 | 41 | 64 | 64 | 64 | 136 (67) |
| Coagulum, p.h.m | 0.13 | 0.38 | 0.13 | 0.21 | 0.13 | 0.17 | 0.06 | 0.05 | 0.01 | 0.09 | 0.12 | 0.02 | 15.0 |
| Latex properties: | | | | | | | | | | | | | |
| Stripped | Yes | No | No | Yes | Yes | No | No | Yes | Yes | No | No | No | No |
| Percent solids | 50 | 47 | 47 | 50 | 51 | 47 | 47 | 52 | 49 | 47 | 47 | 48 | 45 |
| pH | 8.2 | | | 8.6 | 9.2 | | 9.0 | 8.6 | 7.5 | 9.0 | 9.2 | 9.1 | |
| Cation used for pH adjustment | $K^+$ | | | $K^+$ | $K^+$ | | $NH_4^+$ | $K^+$ | $K^+$ | $NH_4^+$ | $NH_4^+$ | $NH_4^+$ | |
| Brookfield viscosity, cp | 110 | | | 368 | 458 | | 194 | 300 | 167 | 70 | 204 | 160 | 1,660 |
| Turbidity | 0.29 | 0.27 | 0.31 | 0.51 | 0.30 | 0.52 | 0.45 | 0.74 | 1.08 | 1.19 | 1.27 | 1.71 | 5.34 |
| Surface tension, d./cm | 65 | | | 72 | 67 | | 72 | 73 | 78 | 70 | 75 | 75 | |
| S-1 stability | 0.37 | | | 0.48 | Nil | | 0.03 | Nil | 0.02 | 0.01 | 0.01 | 0.02 | |

Table 4 clearly shows the outstanding properties of the latexes produced in accordance with the instant invention, and particularly the outstanding absence of foam during the experiments. A good quality product is obtained where the degree of polymerization of the oligomer varies between six and fifty. The higher molecular weight emulsifier results in slow polymerization rates and high coagulum. The emulsion polymerization conducted in the presence of the oligomers having a degree of polymerization from 12 to 30 yield particularly outstanding results as evidenced by the desired viscosity-turbidity relation, high surface tension and excellent mechanical stability (S-1 test).

EXAMPLE V

Again following the procedure and using the recipe set forth in Example III, Table 5 shows the effect of varying the mole fraction of the acrylonitrile, $a/(a+b)$, in the oligomeric emulsifier. In each case the degree of polymerization of the oligomer is 20 and the reaction temperature 50° C.

the mole fraction is less than 0.6, outstanding latex is obtained. Higher mole fractions result in excessive coagulum and failure to support polymerization. The footnote, (3), indicates that the oligomer may be partially hydrolyzed to convert some of the nitrile groups to acid groups, thereby effectively lowering the mole fraction of the former, to yield an effective emulsifier.

EXAMPLE VI

This example shows wide applicability of the emulsifiers of the instant invention to various polymerization systems. Table 6 illustrates the formation of various homopolymers, copolymers, terpolymers, and tetrapolymers both carboxylated and non-functional on oligomeric emulsifiers which show variations in kind of alkyl group, kind of acid monomer and degree of oligomerization. All reactions are performed at 50° C. for 64 hrs. The oligomer, which is used as the emulsifier at 4 parts. is fully neutralized with potassium hydroxide. In addition to the ingredients shown in the table, each polymerization recipe TABLE 5.—POLYMERIZATION OF CARBOXYLATED BUTADIENE-STYRENE LATEX ON OLIGOMERS WITH VARIOUS $a/(a+b)$ VALUES

| | Number | | | | | | |
|---|---|---|---|---|---|---|---|
| | 1 | 2 | 3 | 4 | 4 | 6 | 7 |
| Description of Oligomer (R=n-octyl): | | | | | | | |
| a+b | 20 | 20 | 20 | 20 | 20 | 20 | 20 |
| a/(a+b) | 0 | 0.4 | 0.5 | 0.6 | 0.7 | 0.75 | 0.8 |
| Parts used | ¹ 3.6 | ² 3.96 | 4 | 4 | 4 | ³ No pzn. | ³ No pzn. |
| pH, 10% solution of potassium salt | 9.0 | 6.5 | 6.5 | 6.5 | 6.5 | | |
| Polymerization performance: | | | | | | | |
| Percent conversion | 100 | 98 | 99 | 89 | 82 | | |
| Hours | 64 | 24 | 41 | 64 | 64 | | |
| Coagulum, p.h.m | 0.51 | 0.09 | 0.01 | ³ 28.0 | ³ 28.4 | | |
| Latex Properties: | | | | | | | |
| Stripped | No | Yes | Yes | | | | |
| Percent solids | 47 | 51 | 49 | | | | |
| pH | 5.9 | 8.1 | 7.5 | | | | |
| Cation used for pH adjustment | | $K^+$ | $K^+$ | | | | |
| Brookfield viscosity, cp | 41 | 830 | 167 | | | | |
| Turbidity | 1.03 | 0.58 | 1.08 | | | | |
| Surface tension d./cm | 77 | 81 | 78 | | | | |
| S-1 stability | 0.10 | 0.01 | 0.02 | | | | |

¹ Also included 0.4 of n-dodecyl analog of this oligomer.
² Also included 0.04 of n-dodecyl analog of this oligomer.
³ Hydrolysis of these products with KOH produced much less coagulum.

The data of Table 5 clearly show the importance of the mole fraction of acrylonitrile. In the first three runs where contains 1.25 parts $K_2S_2O_8$, 0.07 part tetrasodium ethylenediamine tetraacetate, and 120 parts water.

TABLE 6.—POLYMERIZATION OF VARIOUS MONOMER SYSTEMS ON VARIOUS OLIGOMERS

| | Number | | | | | | | | |
|---|---|---|---|---|---|---|---|---|---|
| | 1 | 2 | 3 | 4 | 5 | 6 | 7 | 8 | 9 |
| Description of oligomer R-S-(acrylonitrile)$_a$-(A)$_b$-H: | | | | | | | | | |
| R | (1) | (2) | (3) | (3) | (3) | (3) | (2) | (2) | (2) |
| A | (4) | (4) | (4) | (4) | (4) | (4) | (4) | (4) | (4) |
| a+b | 16 | 16 | 16 | 16 | 16 | 16 | 30 | 30 | 50 |
| a/(a+b) | 0.5 | 0.5 | 0.5 | 0.5 | 0.5 | 0.5 | 0.5 | 0.5 | 0.5 |
| Other ingredients in polymerization recipe: | | | | | | | | | |
| Monomers | (6) | (6) | (7) | (8) | (8) | (8) | (6) | (6) | (6) |
| Parts | 72 | 100 | 70 | 98 | 79.2 | 60.5 | 100 | 72 | 10 |
| Monomers | (7) | | (9) | | (7) | (10) | | (7) | (7) |
| Parts | 28 | | 30 | | 18.8 | 18.8 | | 28 | 29 |
| Monomers | | | | (11) | (11) | (11) | | | (8) |
| Parts | | | | 2 | 2 | 2 | | | 60 |
| Monomers | | | | | | | | | (11) |
| Parts | | | | | | | | | 1 |
| K$_2$CO$_3$ | 0.4 | 0.4 | 0.4 | 0.6 | 0.6 | 0.6 | 0.4 | 0.4 | 0.4 |
| t-Dodecyl Mercaptan | 0.3 | 0.5 | None | None | None | None | 0.5 | 0.3 | None |
| Polymerization performance: | | | | | | | | | |
| Percent conversion | 58 | 79 | 99 | 98 | 100 | 98 | 94 | 99 | 100 |
| Coagulum, p.h.m | 0 | 0 | 0 | 0 | 0 | 0.66 | 0 | 0 | 0 |
| Latex properties, unstripped: | | | | | | | | | |
| Percent solids | 31 | 39 | 46 | 45 | 45 | | 45 | 47 | 47 |
| pH (raised with NH$_3$) | *6.3 | 9.0 | 9.1 | 9.0 | 8.9 | | 9.3 | 9.1 | 9.1 |
| Brookfield viscosity, cp | | 40 | 570 | 130 | 175 | 175 | 730 | 614 | 46 |
| Turbidity | 1.56 | 0.77 | 0.39 | 0.07 | 0.06 | 0.08 | 0.58 | 0.75 | 1.46 |
| Surface tension, d./cm | 63 | 61 | 79 | 50 | 55 | 58 | 79 | 79 | 54 |
| S-1 stability | | Nil | 0.13 | 0.04 | 0.04 | 0.13 | 0.14 | 0.07 | 0.15 |

| | Number | | | | | | | |
|---|---|---|---|---|---|---|---|---|
| | 10 | 11 | 12 | 13 | 14 | 15 | 16 | 17 |
| Description of oligomer R-S-(acrylonitrile)$_a$-(A)$_b$-H: | | | | | | | | |
| R | (2) | (2) | (2) | (2) | (2) | (2) | (2) | (2) |
| A | (4) | (4) | (5) | (5) | (4) | (4) | (4) | (4) |
| a+b | 50 | 50 | 16 | 16 | 16 | 16 | 16 | 16 |
| a/(a+b) | 0.5 | 0.5 | 0.5 | 0.5 | 0.5 | 0.5 | 0.5 | 0.5 |
| Other ingredients in polymerization recipe: | | | | | | | | |
| Monomers | (8) | (8) | (6) | (6) | (7) | (6) | (6) | (6) |
| Parts | 98 | 79.2 | 59 | 10 | 100 | 80 | 40 | 40 |
| Monomers | | (7) | (7) | (7) | | (8) | (7) | (7) |
| Parts | | 18.8 | 40 | 29 | | 20 | 57 | 57 |
| Monomers | (11) | (11) | (11) | (8) | | | (4) | (5) |
| Parts | 2 | 2 | 1 | 60 | | | 3 | 3 |
| Monomers | | | | (11) | | | | |
| Parts | | | | 1 | | | | |
| K$_2$CO$_3$ | 0.6 | 0.6 | 0.4 | 0.4 | 0.4 | 0.4 | 0.8 | 0.8 |
| t-Dodecyl mercaptan | None | None | 0.3 | None | None | 0.3 | 0.1 | 0.1 |
| Polymerization performance: | | | | | | | | |
| Percent conversion | 100 | 100 | 98 | 99 | 96 | 91 | 100 | 100 |
| Coagulum, p.h.m | 0.07 | 0.12 | 0 | 0.29 | 0 | 0.03 | 0.04 | 0.55 |
| Latex properties, unstripped: | | | | | | | | |
| Percent solids | 47 | 47 | 46 | 45 | 46 | 44 | 46 | 46 |
| pH (raised with NH$_3$) | 9.1 | 9.1 | 9.1 | 9.3 | 9.4 | 8.9 | 8.8 | 8.9 |
| Brookfield viscosity, cp | 32 | 32 | 80 | 70 | 40 | 38 | 64 | 72 |
| Turbidity | 1.18 | 0.94 | 1.70 | 1.21 | 1.53 | 1.20 | 0.24 | 0.22 |
| Surface tension, d./cm | 48 | 49 | 70 | 53 | 73 | 62 | 65 | 70 |
| S-1 stability | 0.06 | 0.08 | 0.02 | 0.08 | 0.15 | 0.24 | 0.01 | 0.05 |

*pH not raised.
(1) n-Hexyl.
(2) n-Octyl.
(3) n-Decyl.
(4) Acrylic acid.
(5) Methacrylic acid.
(6) Butadiene.
(7) Styrene.
(8) Ethyl acrylate.
(9) Acrylonitrile.
(10) Butyl acrylate.
(11) Itaconic acid.

It will be noted in Table 6 that the emulsion polymerization yields a variety of latexes having outstanding properties, including the observed absence of foaming in the latex. The particular emulsifier which is most satisfactory for a particular polymerization can be readily determined by those skilled in the art. In some systems the preferred emulsifier will have alkyl groups having a greater number of carbon atoms than in the case of the butadiene-styrene-itaconic acid latex illustrated in the previous examples. Similarly, with many of the systems a higher degree of polymerization of the oligomer will be advantageous as will a different mole ratio of the two monomers in the oligomer. Additionally, varying ratios of the monomers to be polymerized in the formation of a latex may have a substantial effect on the properties of the latexes.

EXAMPLE VII

This example describes the preparation of a synthetic rubber by emulsion polymerization using an oligomer of the instant invention as the emulsifying agent. The oligomer, which is fully neutralized with KOH, is represented by the formula: n-octyl-S-(acrylonitrile)$_a$-(acrylic acid)$_b$-H, with $a+b=16$, and $a/(a+b)=0.55$. The polymerization recipe consists of: butadiene 72, styrene 28, K$_2$S$_2$O$_8$ 1.25, oligomer 4, K$_2$CO$_3$ 0.4, tetrasodium ethylenediamine tetraacetate 0.07, t-dodecyl mercaptan 0.3, and water 120. After 64 hours at 50° C., the conversion of monomer to polymer is 89%, and the bottle is removed from the bath. The pH of the latex is raised to 9.2 with NH$_3$, 0.2 part hydroquinone are added and the latex is stripped free of residual monomers. Enough of the latex, which after stripping has 14.7% solids, to give 100 g. solids is mixed with 1.5 g. antioxidant [tri(mixed mono- and dinonylphenyl)-phosphite] in emulsified form. This is added to 250 g. 25% H$_2$SO$_4$ and 1000 g. water with vigorous agitation. A clear serum and small pieces of polymer separate and the polymer is removed, washed and dried. The Mooney viscosity of this synthetic rubber is 112. A similar synthetic rubber is prepared on the sodium salt of a mixed fatty acid and has a Mooney viscosity of 83.

EXAMPLE VIII

This example describes the preparation of a poly-styrene plastic by emulsion addition polymerization using an oligomer of this invention as the emulsifying agent. The oligomer is identical with that used in Example III and the polymerization recipe is identical with that used in Example VII except 100 parts styrene replaces the butadiene and styrene and no t-dodecyl mercaptan is used. After 16 hours the conversion of monomer to polymer is 97%. Without stripping or addition of antioxidants, enough of this latex to give 10 g. solids is added to 100 g. of a 4% alum solution which is vigorously agitated. The polystyrene plastic separates into small pieces which are removed from the clear serum, washed and dried. This plastic will not dissolve in toluene or dimethyl formamide, while a similar one prepared on the sodium salt of a mixed fatty acid dissolves in toluene and has an intrinsic viscosity of 4.51. The polystyrene made with oligomeric emulsifier is also coagulated by adding 24.5 g. of it to a well agitated solution of 20 g. 25% $H_2SO_4$ and 78 g. water. The plastic appears as small pieces and these are removed from the clear serum, washed and dried. The plastic will not dissolve in toluene, but dissolves in methyl ethyl ketone or dimethyl formamide. In the former solvent, the intrinsic viscosity is 2.20.

EXAMPLE IX

The preparation and properties of a butadiene-acrylonitrile rubber polymer by means of emulsion polymerization using an oligomer of the instant invention as the emulsifying agent is described in this example. The oligomer, which is used at pH 4.9 (KOH), is represented by the formula: n-octyl-S-(acrylonitrile)$_a$-(acrylic acid)$_b$-H with $a+b=16$, and $a/(a+b)=0.5$. The polymerization recipe consists of butadiene 60, acrylonitrile 40, $K_2S_2O_8$ 1.25, oligomer 4, t-dodecyl mercaptan 0.4, and water 120. After 15 hours at 50° C., the conversion of monomer to polymer is 97% and the bottle is removed from the bath and is shortstopped with 0.2 hydroquinone. Without stripping, enough of the latex to give 100 g. solids is diluted with 200 g. of water and to this is added, as an emulsion, 1.5 g. antioxidant [tri(mixed mono- and dinonylphenyl)-phosphite]. This mixture is added to a vigorously agitated solution of 250 g. 25% $H_2SO_4$ and 1000 g. water. This system separates into a clear serum and small pieces of polymer which are removed, washed and dried. The Mooney viscosity of this butadiene-acrylonitrile rubber addition polymer is 200+. A similar polymer which is prepared on the sodium salt of mixed fatty acids and flocced with $H_2SO_4$ and NaCl in the presence of the above antioxidant, shows a Mooney viscosity of 120.

EXAMPLE X

This is a description of the preparation and properties of an acrylate rubber. The oligomer used in this example is represented by the formula: n-decyl-S-(acrylonitrile)$_8$-(acrylic acid)$_8$-H, and is fully neutralized with KOH. The polymerization is conducted at 50° C. for 64 hours on the following recipe: butyl acrylate 87, acrylonitrile 13, $K_2S_2O_8$ 1.25, oligomer 5, and water 120. The conversion of monomer to polymer is 100% and there is no coagulum. Enough of this latex to give 100 g. solids is diluted with 200 g. water and, without stripping or adding antioxidant, is run into a vigorously agitated solution of 4 g. alum in 1240 g. water. This system separates into a clear serum and small pieces of polymer which are collected, washed and dried. The Mooney viscosity of this polymer is 52. A similar polymer, which is prepared on sodium lauryl sulfate 2.5 plus sodium condensed naphthalene sulfonate 2.5 in place of the oligomer, has a Mooney viscosity of 44.

The emulsifiers used in the polymerization of the instant invention have a very narrow molecular weight distribution, e.g., the polydispersity index is always less than 2 and frequently as low as 1.4 to 1.5, as determined by the Gel Permeation Chromatographic technique.

Having thus described my invention, what I claim and desire to protect by Letters Patent is:

1. In the emulsion polymerization of ethylenically unsaturated compounds, the improvement of using as an emulsifier, a compound having the formula:

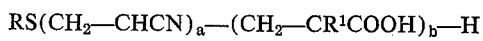

$$RS(CH_2-CHCN)_a-(CH_2-CR^1COOH)_b-H$$

wherein R is a straight chain primary (normal), branched chain primary or secondary alkyl group having from 6 to 12 carbon atoms or mixtures thereof, $R^1$ is hydrogen or methyl, $a+b$ is from 4 to 50, and $a/(a+b)$ is from 0 to 0.6, said emulsifier being used in the form of (1) its salt formed by neutralization with an alkali metal hydroxide, ammonium hydroxide or lower alkyl or alkanol substituted amines, or (2) its partial salt with one of said hydroxides or amines, or (3) a mixed salt formed by completing the neutralization of said partial salt with an alkaline earth or Group IV heavy metal oxide or hydroxide.

2. The emulsion polymerization process of claim 1 wherein the R is a normal alkyl having from 7 to 11 carbon atoms or mixtures thereof, $R^1$ is hydrogen, $a+b$ is from 12 to 30, and $a/(a+b)$ is from 0.2 to 0.55.

3. The emulsion polymerization process of claim 1 wherein R is normal octyl, normal decyl or normal dodecyl, or mixtures thereof, $R^1$ is hydrogen, $a+b$ is about 16 and $a/(a+b)$ is about 0.5.

4. The emulsion polymerization process of claim 1 wherein said monomeric material is polymerized in the tion of a vinyl or conjugated diolefin type monomeric material.

5. The emulsion polymerization process of claim 4 wherein said monomeric material is polymerized in the presence of a carboxylating agent.

6. The emulsion polymerization process of claim 5 wherein said carboxylating agent is itaconic acid, acrylic acid or methacrylic acid.

7. The emulsion polymerization process of claim 4 wherein said monomeric material is butadiene and styrene.

8. The emulsion polymerization process of claim 7 wherein said monomeric material is polymerized in the presence of a carboxylating agent.

9. The emulsion polymerization process of claim 4 wherein said monomeric material is butadiene and acrylonitrile.

10. The emulsion polymerization process of claim 9 wherein said monomeric material is polymerized in the presence of a carboxylating agent.

11. The emulsion polymerization process of claim 4 wherein said monomeric material is an acrylate ester with a minor amount of at least one other vinyl monomer.

12. The emulsion polymerization process of claim 11 wherein said acrylate ester is ethyl acrylate, said other vinyl monomers a mixture of (1) styrene, methyl methacrylate, butyl acrylate or vinyl acetate, and (2) acrylic acid, methacrylic acid or itaconic acid.

13. The emulsion polymerization process of claim 11 wherein said acrylate ester is butyl acrylate and said other vinyl monomer is acrylonitrile.

14. A substantially non-foaming latex containing a polymer of ethylenically unsaturated compounds and, as the emulsifier, a compound having the formula:

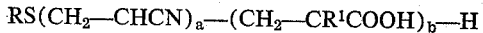

$$RS(CH_2-CHCN)_a-(CH_2-CR^1COOH)_b-H$$

wherein R is a straight chain primary (normal), branched chain primary or secondary alkyl group having from 6 to 12 carbon atoms or mixtures thereof, $R^1$ is hydrogen or methyl, $a+b$ is from 4 to 50, and $a/(a+b)$ is from 0 to 0.6, said emulsifier being used in the form of (1) its salt formed by neutralization with an alkali metal hydroxide, ammonium hydroxide or lower alkyl or alkanol substituted amines, or (2) its partial salt with one of said hydroxides or amines, or (3) a mixed salt formed by completing the neutralization of said partial salt with an alkaline earth or Group IV heavy metal oxide or hydroxide.

15. The latex of claim 14 wherein the R is a normal alkyl having from 7 to 11 carbon atoms or mixtures thereof, $R^1$ is hydrogen, $a+b$ is from 12 to 30, and $a/(a+b)$ is from 0.2 to 0.55.

16. The latex of claim 14 wherein the R is a normal octyl, normal decyl or normal dodecyl, or mixtures thereof, $R^1$ is hydrogen, $a+b$ is about 16 and $a/(a+b)$ is about 0.5.

17. The latex of claim 14 wherein said latex is an addition polymer of a vinyl or conjugated diolefin type monomeric material or mixtures thereof.

18. The latex of claim 17 wherein said latex is carboxylated.

19. The latex of claim 18 wherein said latex is carboxylated with itaconic acid, acrylic acid or methacrylic acid.

20. The latex of claim 17 wherein said latex is a butadiene-styrene latex.

21. The latex of claim 17 wherein said latex is a carboxylated butadiene-styrene latex.

22. The latex of claim 17 wherein said latex is a butadiene-acrylonitrile latex.

23. The latex of claim 22 wherein said latex is a carboxylated butadiene-acrylonitrile latex.

24. The latex of claim 17 wherein said latex is an acrylate ester polymerized with a minor amount of at least one other vinyl monomer.

25. The latex of claim 24 wherein said acrylate ester is ethyl acrylate, said other vinyl monomers are a mixture of (1) styrene, methyl methacrylate, butyl acrylate or vinyl acetate, and (2) acrylic acid, methacrylic acid or itaconic acid.

26. The latex of claim 24 wherein said acrylate ester is butyl acrylate and said other vinyl monomer is acrylonitrile.

27. An addition polymer composition containing an emulsifier and prepared by emulsion polymerization of ethylenically unsaturated compounds using, as the emulsifier, a compound having the formula:

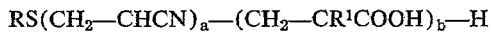

wherein R is a straight chain primary (normal), branched chain primary or secondary alkyl group having from 6 to 12 carbon atoms or mixtures thereof, $R^1$ is hydrogen or methyl, $a+b$ is from 4 to 50, and $a/(a+b)$ is from 0 to 0.6, said emulsifier being used in the form of (1) its salt formed by neutralization with an alkali metal hydroxide, ammonium hydroxide or lower alkyl or alkanol substituted amines, or (2) its partial salt with one of said hydroxides or amines, or (3) a mixed salt formed by completing the neutralization of said partial salt with an alkaline earth or Group IV heavy metal oxide or hydroxide.

28. A composition of claim 27 wherein the R is a normal alkyl having from 7 to 11 carbon atoms or mixtures thereof, $R^1$ is hydrogen, $a+b$ is from 12 to 30, and $a/(a+b)$ is from 0.2 to 0.55.

29. The composition of claim 27 wherein the R is a normal octyl, normal decyl or normal dodecyl, or mixtures thereof, $R^1$ is hydrogen, $a+b$ is about 16 and $a/(a+b)$ is about 0.5.

30. The composition of claim 27 wherein said addition polymer is formed from vinyl or conjugated diolefin type monomeric material or mixtures thereof.

31. The addition polymer composition of claim 30 wherein said polymer is carboxylated.

32. The addition polymer composition of claim 31 wherein said polymer is carboxylated with itaconic acid, acrylic acid or methacrylic acid.

33. The composition of claim 30 wherein said addition polymer is a butadiene-styrene polymer.

34. The addition polymer composition of claim 30 wherein said polymer is a butadiene-acrylonitrile polymer.

35. The addition polymer composition of claim 34 wherein said polymer is a carboxylated butadiene-acrylonitrile polymer.

36. The composition of claim 30 wherein said addition polymer is an acrylate ester polymerized with a minor amount of at least one other vinyl monomer.

37. The composition of claim 36 wherein said acrylate ester is ethyl acrylate, said other vinyl monomers are a mixture of (1) styrene, methyl methacrylate, butyl acrylate or vinyl acetate, and (2) acrylic acid, methacrylic acid or itaconic acid.

38. The composition of claim 36 wherein said acrylate ester is butyl acrylate and said other vinyl monomer is acrylonitrile.

39. A latex formed directly by emulsion polymerization of ethylenically unsaturated compounds using an emulsifier having the formula:

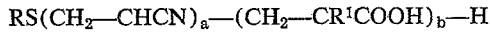

wherein R is a straight chain primary (normal), branched chain primary or secondary alkyl group having from 6 to 12 carbon atoms or mixtures thereof, $R^1$ is hydrogen or methyl, $a+b$ is from 4 to 50, and $a/(a+b)$ is from 0 to 0.6, said emulsifier being used in the form of (1) its salt formed by neutralization with an alkali metal hydroxide, ammonium hydroxide or lower alkyl or alkanol substituted amines, or (2) its partial salt with one of said hydroxides or amines, or (3) a mixed salt formed by completing the neutralization of said partial salt with an alkaline earth or Group IV heavy metal oxide or hydroxide.

40. In the emulsion polymerization of ethylenically unsaturated compounds, the improvement of performing said process in the presence of a persulfate and of a compound having the formula:

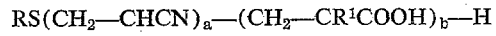

wherein R is a straight chain primary (normal), branched chain primary or secondary alkyl group having from 6 to 12 carbon atoms or a mixture thereof, $R^1$ is hydrogen or methyl, $a+b$ is from 4 to 50, and $a/(a+b)$ is from 0 to 0.6 said compound being used in the form of (1) its salt formed by neutralization with an alkali metal hydroxide, ammonium hydroxide or lower alkyl or alkanol substituted amines, or (2) its partial salt with one of said hydroxides or amines, or (3) a mixed salt formed by completing the neutralization of said partial salt with an alkaline earth or Group IV heavy metal oxide or hydroxide.

41. A latex containing a polymer of ethylenically unsaturated compounds and formed directly in the presence of a persulfate and of a compound having the formula:

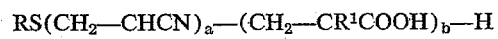

wherein R is a straight chain primary (normal), branched chain primary or secondary alkyl group having from 6 to 12 carbon atoms or a mixture thereof, $R^1$ is hydrogen or methyl, $a+b$ is from 4 to 50, and $a/(a+b)$ is from 0 to 0.6, said compound being used in the form of (1) its salt formed by neutralization with an alkali metal hydroxide, ammonium hydroxide or lower alkyl or alkanol substituted amines, or (2) its partial salt with one of said hydroxides or amines, or (3) a mixed salt formed by completing the neutralization of said partial salt with an alkaline earth or Group IV heavy metal oxide or hydroxide.

42. An addition polymer composition containing an emulsifier and prepared by emulsion polymerization of ethylenically unsaturated compounds in the presence of a persulfate and of the emulsifier having the formula:

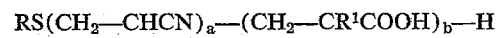

wherein R is a straight chain primary (normal), branched chain primary or secondary alkyl group having from 6 to 12 carbon atoms or mixtures thereof, $R^1$ is hydrogen or methyl, $a+b$ is from 4 to 50, and $a/(a+b)$ is from 0 to 0.6, said compound being used in the form of (1) its salt formed by neutralization with an alkali metal hydroxide, ammonium hydroxide or lower alkyl or alkanol substituted amines, or (2) its partial salt with one of said hydroxides or amines, or (3) a mixed salt formed by completing the neutralization of said partial salt with an alkaline earth or Group IV heavy metal oxide or hydroxide.

43. A latex formed directly by the emulsion polymerization of ethylenically unsaturated compounds in the presence of a persulfate and of a compound having the formula:

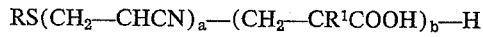
$$RS(CH_2—CHCN)_a—(CH_2—CR^1COOH)_b—H$$

wherein R is a straight chain primary (normal), branched chain primary or secondary alkyl group having from 6 to 12 carbon atoms or mixtures thereof, $R^1$ is hydrogen or methyl, $a+b$ is from 4 to 50, and $a/(a+b)$ is from 0 to 0.6, said compound being used in the form of (1) its salt formed by neutralization with an alkali metal hydroxide, ammonium hydroxide or lower alkyl or alkanol substituted amines, or (2) its partial salt with one of said hydroxides or amines, or (3) a mixed salt formed by completing the neutralization of said partial salt with an alkaline earth or Group IV heavy metal oxide or hydroxide.

44. The emulsion polymerization process of claim 40 wherein the R is a normal alkyl having from 7 to 11 carbon atoms or mixtures thereof, $R^1$ is hydrogen, $a+b$ is from 12 to 30, and $a/(a+b)$ is from 0.2 to 0.55.

45. The emulsion polymerization process of claim 40 wherein R is normal octyl, normal decyl or normal dodecyl, or mixtures thereof, $R^1$ is hydrogen, $a+b$ is about 16 and $a/(a+b)$ is about 0.5.

46. The emulsion polymerization process of claim 40 wherein said polymerization is the addition polymerization of a vinyl conjugated diolefin type monomeric material.

47. The emulsion polymerization process of claim 46 wherein said monomeric material is polymerized in the presence of a carboxylating agent.

48. The emulsion polymerization process of claim 47 wherein said carboxylating agent is itaconic acid, acrylic acid or methacrylic acid.

49. The emulsion polymerization process of claim 46 wherein said monomeric material is butadiene and styrene.

50. The emulsion polymerization process of claim 49 wherein said monomeric material is polymerized in the presence of a carboxylating agent.

51. The emulsion polymerization process of claim 46 wherein said monomeric material is butadiene and acrylonitrile.

52. The emulsion polymerization process of claim 51 wherein said monomeric material is polymerized in the presence of a carboxylating agent.

53. The emulsion polymerization process of claim 46 wherein said monomeric material is an acrylate ester with a minor amount of at least one other vinyl monomer.

54. The emulsion polymerization of claim 53 wherein said acrylate ester is ethyl acrylate, said other vinyl monomers a mixture of (1) styrene, methyl methacrylate, butyl acrylate or vinyl acetate, and (2) acrylic acid, methacrylic acid or itaconic acid.

55. The emulsion polymerization process of claim 53 wherein said acrylate ester is butyl acrylate and said other vinyl monomer is acrylonitrile.

References Cited

UNITED STATES PATENTS

| | | |
|---|---|---|
| 3,131,158 | 4/1964 | Kemp et al. |
| 2,396,997 | 3/1946 | Fryling _____ 260—79.5 |
| 2,848,434 | 8/1958 | Hellman. |
| 3,028,367 | 4/1962 | O'Brien. |

SAMUEL H. BLECH, Primary Examiner

W. J. BRIGGS, Sr, Assistant Examiner

U.S. Cl. X.R.

260—29.7, 78.5, 80.7, 80.8, 80.81, 82.1, 82.7, 84.3, 85.5, 85.7, 86.1, 86.7, 88.1, 88.7, 89.5, 93.5, 94.4, 526

UNITED STATES PATENT OFFICE
CERTIFICATE OF CORRECTION

Patent No. 3,498,942     Dated December 10, 1969

Inventor(s) Leland E. Dannals

It is certified that error appears in the above-identified patent and that said Letters Patent are hereby corrected as shown below:

Column 14, line 26, cancel "monomeric material is polymerized in the" and insert --polymerization is the addition polymeriza- --.

Column 16, line 41, after "0.6" insert --,--.

Signed and sealed this 1st day of September 1970.

(SEAL)
Attest:

EDWARD M. FLETCHER, JR.
Attesting Officer

WILLIAM E. SCHUYLER, JR.
Commissioner of Patents